(12) United States Patent
Latorre Plaza et al.

(10) Patent No.: US 9,073,271 B2
(45) Date of Patent: Jul. 7, 2015

(54) MANUFACTURING PROCEDURE OF A COMPOSITE PART OF A CLOSED COMPARTMENT WITH AN INTEGRATED ACCESS ASSEMBLY

(75) Inventors: Teresa Latorre Plaza, Madrid (ES); Vicente Martínez Valdegrama, Madrid (ES); José Orencio Granado Macarrilla, Torrejón de la Calzada (ES)

(73) Assignee: Airbus OPERATIONS, S.L., Madrid (ES)

( * ) Notice: Subject to any disclaimer, the term of this patent is extended or adjusted under 35 U.S.C. 154(b) by 769 days.

(21) Appl. No.: 13/348,170

(22) Filed: Jan. 11, 2012

(65) Prior Publication Data

US 2013/0026294 A1    Jan. 31, 2013

(30) Foreign Application Priority Data

Jul. 28, 2011   (ES) .................................. 201131291

(51) Int. Cl.
*B29C 70/30* (2006.01)
*B29C 70/54* (2006.01)
*B29L 31/30* (2006.01)

(52) U.S. Cl.
CPC ............ *B29C 70/30* (2013.01); *Y10T 29/49826* (2015.01); *Y10T 156/1062* (2015.01); *B29C 70/545* (2013.01); *B29L 2031/3085* (2013.01); *Y02T 50/433* (2013.01)

(58) Field of Classification Search
CPC .................. B29C 70/545; B29C 70/30; B29L 2031/3085; B21D 35/007; B21D 53/00; B62D 65/04; Y10T 29/49826; Y10T 29/4932; Y10T 29/49787; Y10T 29/49789; Y10T 29/49794; Y10T 29/49796; Y10T 156/1062; Y02T 50/43; Y02T 50/433

See application file for complete search history.

(56) References Cited

U.S. PATENT DOCUMENTS 3,977,933 A * 8/1976 Sadashige ..................... 156/250
5,452,867 A   9/1995 Grunwald et al.

(Continued)

FOREIGN PATENT DOCUMENTS

| ES | 2240831 | 10/2005 |
|---|---|---|
| WO | 01/58680 | 8/2001 |
| WO | 2010/004159 | 1/2010 |

OTHER PUBLICATIONS

ES201131291 Spanish Search Report dated Jul. 22, 2013 (5 pages).

*Primary Examiner* — Sarang Afzali
(74) *Attorney, Agent, or Firm* — Michael Best & Friedrich LLP

(57) ABSTRACT

Procedure for the manufacture of a composite part (13) of a closed compartment, said part (13) having an access assembly to said compartment through an opening (11) in said part (13), said access assembly comprising a cover (27) for said opening (11) and a housing panel (25) for said cover (27), comprising steps of: a) providing common laminates (31, 31', 31") of a composite material for said cover (27) and said housing panel (25) in an uncured state; b) cutting said common laminates (31, 31', 31") by the perimeter foreseen for said cover (27) and separating the cover laminates (33, 33', 33") and the housing panel laminates (35, 35', 35"); c) manufacturing separately, on the one side, the cover (27) using said cover laminates (31, 31', 31") and, on the other side, the part (13) together with said housing panel (25) using said housing panel laminates (35, 35', 35").

8 Claims, 3 Drawing Sheets

(56) References Cited

U.S. PATENT DOCUMENTS

| | | | |
|---|---|---|---|
| 5,961,288 A * | 10/1999 | Rene Legendre et al. | 416/134 A |
| 7,981,241 B2 * | 7/2011 | Kaye et al. | 156/307.1 |
| 2003/0146346 A1 * | 8/2003 | Chapman, Jr. | 244/123 |
| 2009/0001217 A1 * | 1/2009 | Dufresne et al. | 244/119 |

* cited by examiner

MANUFACTURING PROCEDURE OF A COMPOSITE PART OF A CLOSED COMPARTMENT WITH AN INTEGRATED ACCESS ASSEMBLY

FIELD OF THE INVENTION

The present invention refers to the manufacturing procedure of a composite part of a close compartment with an integrated access assembly and, more in particular, to the manufacturing procedure of a lower skin of an aircraft wing with an access assembly to an air intake in a surge tank placed at the tip of the wing.

BACKGROUND OF THE INVENTION

The main structure for aircraft lifting surfaces mainly consists of a leading edge, a torsion box, a trailing edge, a root joint and a wing tip. The torsion box in turn consists of several structural elements: upper and lower skins stiffened by stringers on one side; spars and ribs on the other side. Typically, the structural elements forming the torsion box are manufactured separately and are joined with the aid of complicated tooling to achieve the necessary tolerances, which are given by the aerodynamic, assembly and structural requirements.

SUMMARY OF THE INVENTION

Nowadays, and particularly in the aeronautical industry, composite materials with an organic matrix and continuous fibres, especially CFRP (Carbon Fibre Reinforced Plastic) are widely used in a great variety of structural elements. For example, all the elements which make up the torsion box enumerated beforehand (ribs, stringers, spars and skins) can be manufactured using CFRP.

The skins which make up the torsion boxes are stiffened with span wise longitudinal stringers that improve both the strength and the buckling behaviour of the skins having different cross sections such as "T", "I" or "J" shaped cross sections.

Aircraft fuel tanks are usually housed in the torsion box of the aircraft wing. One of them, called vent tank or surge tank, include venting means through an opening in the lower skin for allowing that the air can flow from the atmosphere to the fuel tanks when the tanks are drained and that a mixture of gases can flow from the tanks to the atmosphere when the tanks are filled.

The design and manufacture of said torsion boxes involves several problems. One of them is the access assembly to said venting opening.

In the known solutions for said problem, the lower skin is manufactured leaving a recess around the venting hole for a further installation in it of a suitable access assembly. An important drawback of this solution is that requires an installation operation during the assembly of the torsion box of the wing that involves time and costs.

This invention is focused on the solution of this problem.

One object of the present invention is to provide a more efficient procedure for the manufacture of the lower skin of an aircraft wing including the access assembly to the vent hole of a surge tank and similar parts made of composite material with an access assembly to inner compartments.

These and other objects are met by a procedure for the manufacture of a composite part of a closed compartment, said part having at least an access assembly to said compartment through an opening in said part, said access assembly comprising a cover for said opening and a housing panel for said cover, comprising steps of: a) providing common laminates of a composite material for said cover and said housing panel in an uncured state; b) cutting said common laminates by the perimeter foreseen for said cover and separating the cover laminates and the housing panel laminates; c) manufacturing separately, on the one side, the cover using said cover laminates and, on the other side, the part together with said housing panel using said housing panel laminates.

In embodiments of the invention the manufacturing of the part together with said housing panel comprises steps of: c1) placing an extended housing panel laminate formed by said housing panel laminates and additional plies to be laid-up between them over a suitable mould for said part in the position foreseen for said access assembly; c2) placing a dummy in the inner space of said extended housing panel laminate; c3) laying-up plies of a composite material over said extended housing panel laminate and said dummy for conforming said part together with said housing panel; c4) curing the ensemble; c5) withdrawing said dummy. Hereby it is achieved a procedure for the manufacture of said part together with a housing panel duly configured for its assembly with the cover.

In embodiments of the invention said part is the lower skin of an aircraft wing, said closed compartment is a surge tank placed at the tip of the wing and said opening is an air intake opening. Hereby it is achieved a procedure for the manufacture of the lower skin of an aircraft wing (with, preferably, CFRP) that includes the manufacturing of the cover and the housing panel of the access assembly to the surge tank without wasting any material as happened in the prior art.

In embodiments of the invention said common laminates are packets of CFRP plies. Hereby it is achieved a procedure for the manufacture of the lower skin of an aircraft wing that includes the simultaneous manufacturing of the cover and the housing panel of the access assembly to the surge tank.

In embodiments of the invention said extended housing panel laminate is placed over a base previously disposed over a suitable mould for said part in the position foreseen for said access assembly comprising an adhesive layer and a metallic layer. Hereby it is achieved a procedure for the manufacture of the lower skin of an aircraft wing that includes the simultaneous manufacturing of the cover and the housing panel of the access assembly to the surge tank allowing the incorporation of a metallic layer to the housing panel of the access assembly and also to the borders of the lower skin for lightening protection.

The invention also comprises a lower skin of an aircraft wing with an access assembly to an air intake in a surge tank placed at the tip of the wing manufactured by the above-mentioned procedures and an aircraft comprising such lower skin.

Other characteristics and advantages of the present invention will be clear from the following detailed description of embodiments illustrative of its object in relation to the attached figures.

DETAILED DESCRIPTION OF THE INVENTION

Figure 1:
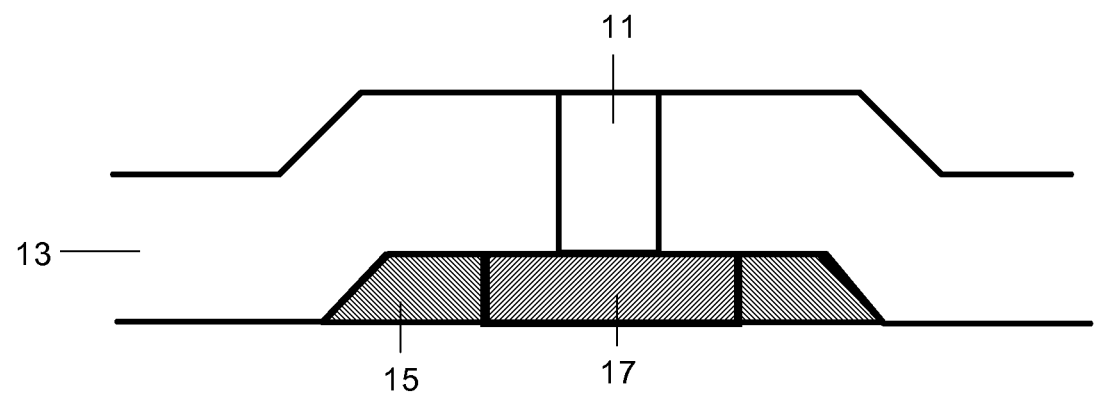
FIG. 1 is a schematic transversal view of a lower skin of an aircraft wing with a known access assembly for an air intake in the surge tank placed at the tip of the wing.
Figure 2:
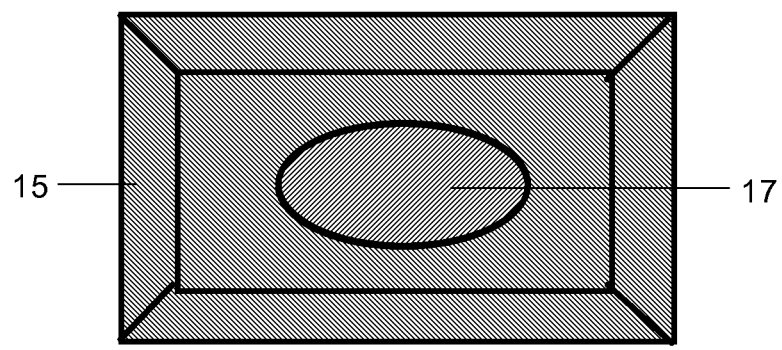
FIG. 2 is a perspective view of the housing panel used in the access assembly of FIG. 1.

The invention relates to access assemblies to close compartments such as the access assembly illustrated in FIGS. 1 and 2 to a vent tank housed in an aircraft wing through a vent hole 11 in its lower skin 13 made of a composite material.

For the purposes of the present invention, said access assembly according to the prior art comprise a housing panel 15 and a cover 17 of a suitable material that are manufactured separately and installed on the lower skin of the wing using suitable fastening means.

Figure 3:
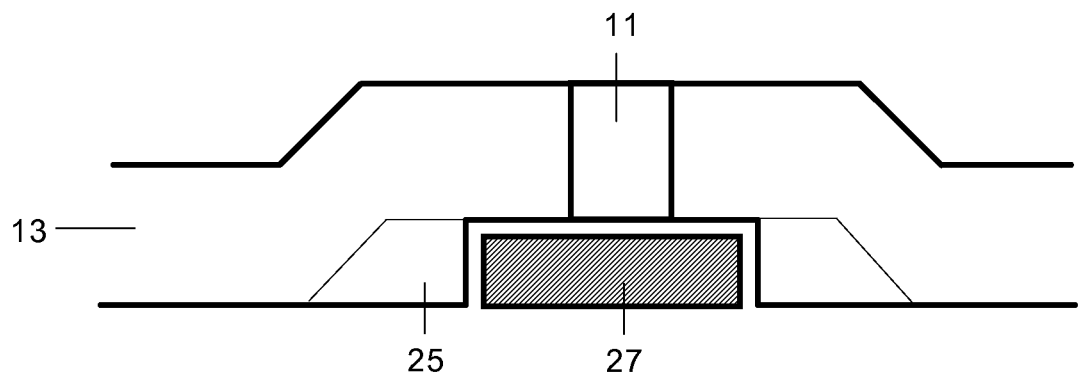
FIG. 3 is a schematic transversal view of a lower skin of an aircraft wing with an access assembly for an air intake in the surge tank placed at the tip of the wing according to the present invention.

The objectives of the present invention, as illustrated in FIG. 3, are that the housing panel 25 is manufactured together with the lower skin 13 and that the cover 27 be manufactured in a manner that assures a good adaptation to the housing panel 25.

Figure 4:
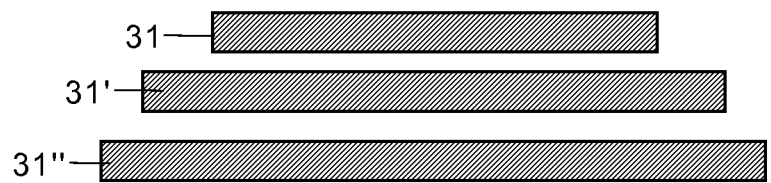
FIGS. 4 and 5 illustrate the main steps of a procedure for manufacturing the main components of an access assembly in a lower skin of an aircraft wing for an air intake in the surge tank placed at the tip of the wing according to the present invention.
Figure 5:
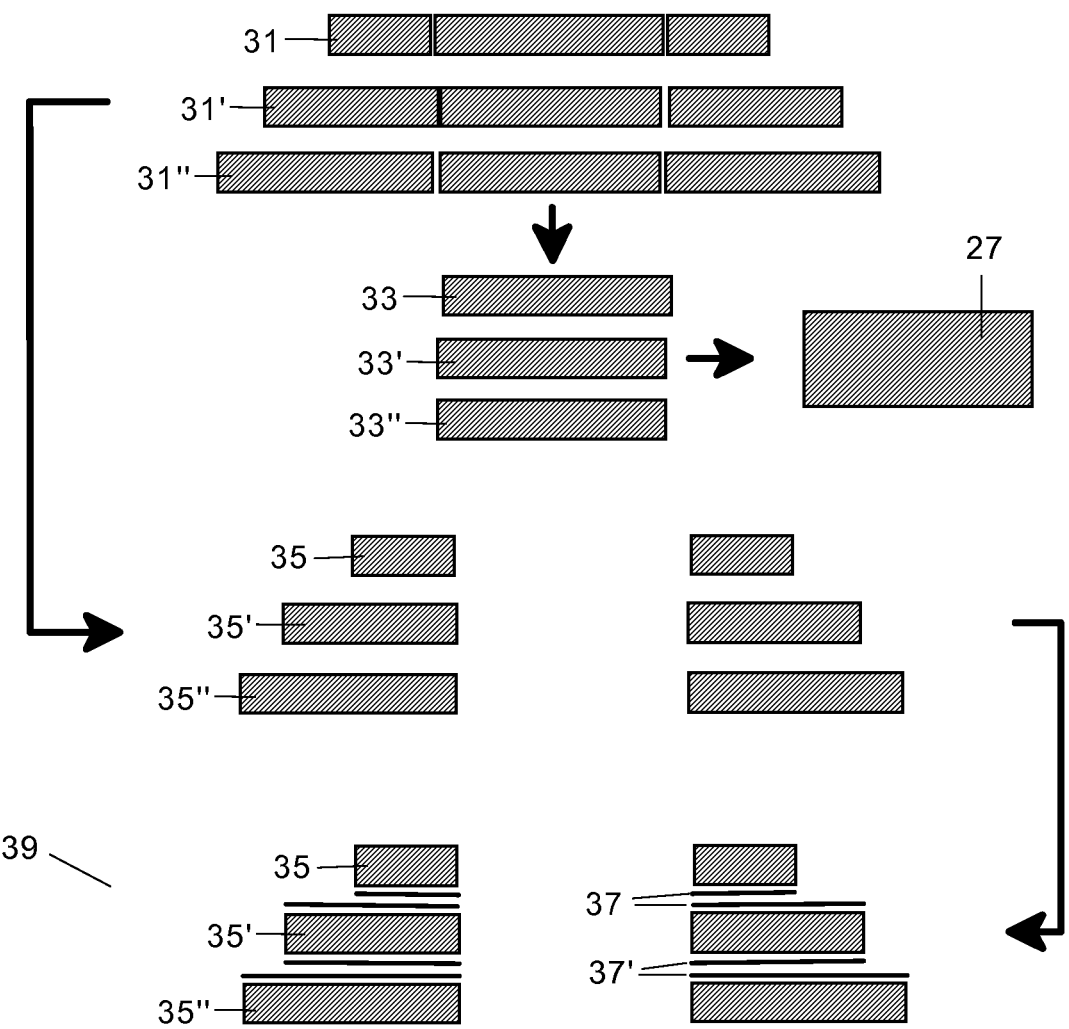
Figure 6:
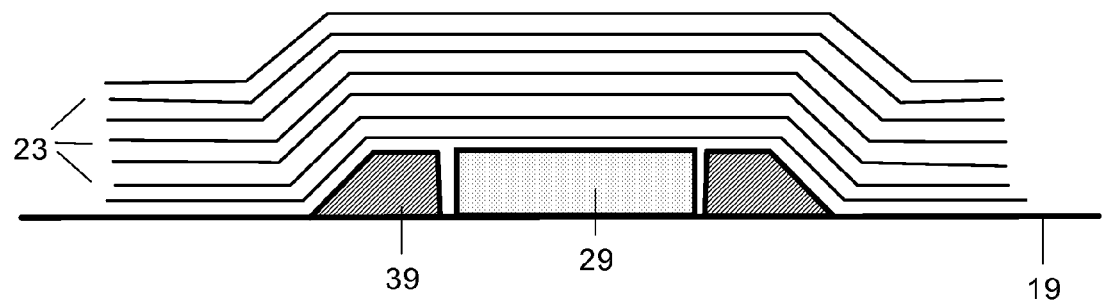
FIG. 6 is a transversal view of the laminate structure of a lower skin of an aircraft wing with an access assembly according to the present invention.

The manufacturing procedure for achieving said objectives comprise the following steps (see FIGS. 4, 5, 6):

Providing common laminates 31, 31', 31" of a composite material for the cover 27 and the housing panel 25 in an uncured state. They have a different length for conforming a housing panel with ramped edges as in FIG. 2.

Cutting said common laminates 31, 31', 31" by the perimeter foreseen for the cover 27 and obtaining, on the one side, cover laminates 33, 33', 33" and, on the other side, housing panel laminates 35, 35', 35". The uncured state of the laminates facilitates the cutting operation using a conventional cutting tool.

The cover laminates 33, 33', 33" are used for obtaining the cover 27 placing them over a suitable mould and subjecting the ensemble to a curing process.

The housing panel laminates 35, 35', 35" are used together with additional plies 37, 37' to be laid-up between them for preparing and placing an extended housing panel laminate 39 over the mould 19 to be used for manufacturing the lower skin 13 in the position foreseen for said access assembly. Said additional plies 37, 37' are used for giving the housing panel laminate 39 a greater thickness than the cover 27 for providing room for its installation so that the aerodynamic continuity on the outer surface of the access assembly is maintained.

Laying-up plies 23 of composite material over said extended housing panel laminate 39 and a dummy 29 placed in its inner space for conforming the lower skin 13. This step can be performed using conventional techniques and, particularly, laying-up CFRP "prepeg" plies using an ATL machine (it should be noted in this respect that FIG. 6 does not show the ramps of plies 23 at a real scale).

Finally the ensemble is cured and after that the dummy 29 is extracted from the cured ensemble. Preferably the dummy 29 is made of invar for controlling the inner geometry of the access assembly of the lower skin 13 for assuring a good assembly of the cover 27.

In embodiments of the invention, said common laminates 31, 31', 31", whose structure shall comply with the strength requirements of the cover 27, are packets of CFRP plies and said additional plies 37, 37' are CFRP plies.

Figure 7:
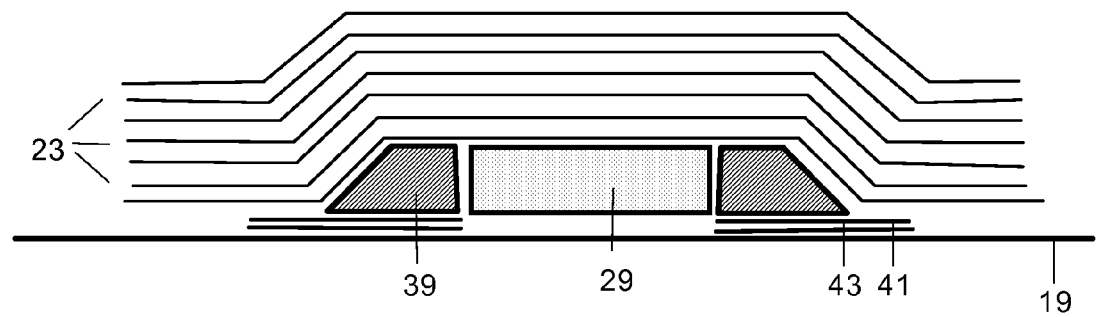
FIG. 7 is the same view than FIG. 6 including a base with an adhesive layer and a metallic layer under the access assembly.

In an embodiment of the invention (see FIG. 7) said extended housing panel laminate 39 is placed over a base previously placed over the mould 19 comprising:
 an adhesive layer 41;
 a metallic layer 43 (preferably a bronze mesh).

Although the present invention has been fully described in connection with preferred embodiments, it is evident that modifications may be introduced within the scope thereof, not considering this as limited by these embodiments, but by the contents of the following claims.

The invention claimed is:

1. A procedure for manufacturing of a composite part (13) of a closed compartment, said part (13) having at least an access assembly to said compartment through an opening (11) in said part (13), said access assembly comprising a cover (27) for said opening (11) and a housing panel (25) for said cover (27), the procedure comprising steps of:
 a) providing common laminates (31, 31', 31") of a composite material for said cover (27) and said housing panel (25) in an uncured state;
 b) cutting said common laminates (31, 31', 31") by the perimeter foreseen for said cover (27) and separating the cover laminates (33, 33', 33") and housing panel laminates (35, 35', 35"); and
 c) manufacturing separately, on the one side, the cover (27) using said separated cover laminates (33, 33', 33") and, on the other side, said part (13) together with said housing panel (25) using said separated housing panel laminates (35, 35', 35").

2. The procedure according to claim 1, wherein the manufacturing of said part (13) together with said housing panel (25) comprises steps of:
 c1) placing an extended housing panel laminate (39) formed by said separated housing panel laminates (35, 35', 35") and additional plies (37, 37') of a composite material to be laid-up between each adjacent part of said separated housing panel laminates (35, 35', 35") over a suitable mould (19) for said part (13) in the position foreseen for said access assembly;
 c2) placing a dummy (29) in an inner space of said extended housing panel laminate (39);
 c3) laying-up plies (23) of a composite material over said extended housing panel laminate (39) and said dummy (29) for conforming said part (13) together with said housing panel (25);
 c4) curing the laid-up piles (23) of a composite material with said extended panel laminate (39) and said dummy (29); and
 c5) withdrawing said dummy (29) after said curing.

3. The procedure according to claim 2, wherein said part (13) is a lower skin of an aircraft wing, said closed compartment is a surge tank placed at a tip of the wing and said opening (11) is an air intake opening.

4. The procedure according to claim 3, wherein the laid-up composite plies (23) for conforming said part (13) in step c3 are carbon fibre reinforced plastic (CFRP) plies.

5. The procedure according to claim 3, wherein said common laminates (31, 31', 31") are packets of carbon fibre reinforced plastic (CFRP) plies.

6. The procedure according to claim 3, wherein said additional plies (37, 37') of a composite material laid-up between each adjacent pair of said separated housing panel laminates (35, 35', 35") are carbon fibre reinforced plastic (CFRP) plies.

7. The procedure according to claim 3, wherein said extended housing panel laminate (39) is placed over a base previously disposed over said suitable mould (19) comprising an adhesive layer (41) and a metallic layer (43).

8. The procedure according to claim 3, wherein said dummy (29) is made of invar.

* * * * *